(12) United States Patent
Gabel et al.

(10) Patent No.: US 10,106,456 B2
(45) Date of Patent: Oct. 23, 2018

(54) GLASS AND GLASS CERAMIC

(71) Applicant: SCHOTT AG, Mainz (DE)

(72) Inventors: Falk Gabel, Schlangenbad (DE); Evelin Weiss, Mainz (DE); Michael Bug, Muehltal (DE); Friedrich Siebers, Nierstein (DE); Thoralf Johansson, Nieder-Olm (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 15/049,261

(22) Filed: Feb. 22, 2016

(65) Prior Publication Data

US 2016/0168018 A1 Jun. 16, 2016

Related U.S. Application Data

(63) Continuation of application No. PCT/EP2014/067427, filed on Aug. 14, 2014.

(30) Foreign Application Priority Data

Aug. 22, 2013 (DE) .......... 10 2013 216 736

(51) Int. Cl.
  *C03C 3/097* (2006.01)
  *C03C 10/12* (2006.01)
  *C03C 10/00* (2006.01)

(52) U.S. Cl.
  CPC .......... *C03C 10/0027* (2013.01); *C03C 3/097* (2013.01)

(58) Field of Classification Search
  CPC ......... C03C 3/085; C03C 3/095; C03C 3/097; C03C 10/0027
  See application file for complete search history.

(56) References Cited

U.S. PATENT DOCUMENTS

| | | | | |
|---|---|---|---|---|
| 7,981,823 B2 * | 7/2011 | Siebers | .................. | C03C 3/095 428/428 |
| 8,685,873 B2 * | 4/2014 | Siebers | .................. | C03C 3/095 501/68 |
| 9,067,820 B2 * | 6/2015 | Chauvel-Melscoet | ...................... | C03C 3/085 |
| 9,126,859 B2 * | 9/2015 | Nakane | .................. | C03C 3/097 |
| 9,296,645 B2 * | 3/2016 | Siebers | .................. | C03C 3/095 |

(Continued)

FOREIGN PATENT DOCUMENTS

DE 102004001176 A1 8/2005
DE 202004009227 U1 9/2005

(Continued)

OTHER PUBLICATIONS

International Search Report dated Dec. 15, 2014 for Corresponding PCT/EP2014/067427, 3 pages.

(Continued)

*Primary Examiner* — Karl E Group
(74) *Attorney, Agent, or Firm* — Ohlandt, Greeley, Ruggiero & Perle, L.L.P.

(57) ABSTRACT

An LAS-glass for producing a transparent glass-ceramic and an LAS-glass-ceramic having a predetermined chroma C* and a predetermined visually determinable scatter value (S) are provided. The LAS-glass and LAS-glass-ceramic has a process window as large as possible during the nucleus formation process with respect to the residence time in the relevant temperature range for the formation of nuclei.

5 Claims, 9 Drawing Sheets

(56) References Cited

U.S. PATENT DOCUMENTS

| | | | |
|---|---|---|---|
| 2002/0023463 A1 | 2/2002 | Siebers et al. | |
| 2007/0232476 A1 | 10/2007 | Siebers et al. | |
| 2009/0018007 A1* | 1/2009 | Siebers | C03C 3/095 501/63 |
| 2010/0130342 A1* | 5/2010 | Siebers | C03C 3/095 501/7 |
| 2010/0154622 A1 | 6/2010 | Zachau et al. | |
| 2012/0302422 A1 | 11/2012 | Siebers et al. | |
| 2013/0164509 A1 | 6/2013 | Siebers et al. | |
| 2014/0357468 A1* | 12/2014 | Siebers | C03C 3/095 501/32 |

FOREIGN PATENT DOCUMENTS

| | | |
|---|---|---|
| DE | 102008043718 A1 | 5/2010 |
| DE | 102010032113 A1 | 1/2012 |
| DE | 102013216736 * | 2/2015 |
| EP | 1146018 A1 | 10/2001 |
| EP | 1837312 A1 | 9/2007 |
| EP | 1837314 B1 | 8/2009 |
| EP | 1837312 B1 | 5/2010 |
| JP | H11228180 | 8/1999 |
| JP | H11228181 | 8/1999 |
| WO | 2008065166 A1 | 6/2008 |
| WO | 2008065167 A1 | 6/2008 |

OTHER PUBLICATIONS

Sakamoto et al. "Structural relaxation and optical properties in nanocrystalline β-quartz glass-ceramic", Journal of Non-Crystalline Solids 352 (2006) pp. 514-518.

Schiffner et al: "Nucleation in a precursor glass for a $Li_2O$-$Al_2O_3$-$SiO_2$ glass ceramic". Part 1. Nucleation kinetics, Glastechnische Berichte 60, Nr. 6, 1.12.1987, pp. 211-221.

Schiffner et al: "Nucleation in a precursor glass for a Li20-Al2O3-SiO2 glass ceramic", Glastechnische Berichte, Bd. 60, Nr. 7, Frankfurt, 1987, pp. 239-247.

International Preliminary Report on Patentability dated Jul. 21, 2015 for Corresponding PCT/EP2014/067427, with English translation, 21 pages.

* cited by examiner

GLASS AND GLASS CERAMIC

CROSS REFERENCE TO RELATED APPLICATIONS

This application is a continuation of International Application No. PCT/EP2014/067427 filed Aug. 14, 2014, which claims benefit under 35 U.S.C. § 119(a) of German Patent Application No. 102013216736.9 filed Aug. 22, 2013, the entire contents of both of which are incorporated herein by reference.

BACKGROUND OF THE INVENTION

1. Field of the Invention

The invention relates to a glass and a glass ceramic.

2. Description of Related Art

It is generally known that glasses of the $Li_2O$—$Al_2O_3$—$SiO_2$ system can be converted into glass ceramics having high quartz mixed crystals/solid solution and/or keatite mixed crystals/solid solution as primary crystal phases. The ceramicizing processes known for this purpose are described in a large number of publications. These involve a temperature process, by means of which the initial glass is converted into the glass-ceramic article by controlled crystallization. This so-called ceramicizing takes place in a two-step temperature process, as is known, in which typically first, nuclei are produced by an isothermal nucleation at a temperature between 680° C. and 810° C., usually from $ZrO_2$/$TiO_2$ mixed crystals. $SnO_2$ can also participate in the nucleation.

With subsequent increase in temperature, the high quartz mixed crystals grow on these nuclei. High rates of crystal growth, such as are desired for an economical, rapid ceramicizing, are obtained at temperatures of 800° C. to 950° C., in each case depending on material composition. Typical for a rapid ceramicizing, i.e., a short ceramicizing duration, are high maximum temperatures. The latter usually lie above 880° C. and assure that a significant crystal growth can occur despite a short residence time in this range.

At the maximum temperature, the structure of the glass ceramic is homogenized and the optical, physical, and chemical properties are finely adjusted. If desired, the high quartz mixed crystals can subsequently still be converted into keatite mixed crystals. The conversion into keatite mixed crystals is produced with an increase in temperature in a temperature range of approximately 970 to 1250° C. With the conversion, the thermal expansion coefficient of the glass ceramic increases and with further crystal growth, light scattering occurs, combined with a translucent to opaque appearance.

A number of requirements are placed on glass ceramics and the production methods belonging thereto, particularly on the ceramicizing method, environmental friendliness gaining increasing significance.

Environmental friendliness is based on the fact that the glass ceramic is technically free of the usual refining agents, arsenic oxide and antimony oxide. As an impurity, these components are usually present in contents of less than 500 ppm, generally less than 200 ppm. In exceptional cases, the $As_2O_3$ content can be a maximum of 1000 ppm, if shards of a transparent glass ceramic containing arsenic oxide are added to the melt as a refining agent. Since an effective contribution to environmental protection is provided with such recycling due to savings in energy and raw materials, in this case, a higher $As_2O_3$ content of up to 1000 ppm is permissible.

The favorable manufacturing properties include low melting and shaping temperatures, resistance to devitrification, and rapid ceramicizing capability.

For economical ceramicizing, short ceramicizing times and low maximum temperatures, i.e., low energy requirements, are desired overall, whereby the transparency of the glass ceramic must not suffer due to coloring and scattering.

With applications of transparent glass ceramics, usually a high transparency, i.e., light transmittance (brightness Y) in the visible region greater than 84%, and little color (chromaticity) C*, thus a neutral hue, are desired.

In addition, visually disruptive light scattering that is made noticeable as clouding (haze) must not occur.

Absorption and scattering are thus the optical phenomena that must be mastered for economical production.

Due to the use of arsenic oxide as a refining agent, the requirements for a particularly high transparency (high light transmittance and slight color) and particularly favorable conversion kinetics of the glass ceramics are fulfilled in fact, but not the requirements for environmental friendliness.

The brownish coloring of transparent lithium aluminum silicate glass ceramics has different causes that are primarily based on absorption mechanisms and on scattering.

The requirement for environmental friendliness is fulfilled, e.g., by the use of $SnO_2$ instead of $As_2O_3$ as an environmentally-friendly refining agent, but of course, the emergent Sn/Ti complexes bring about an additional absorption to Fe/Ti color complexes.

The coloring element Fe is contained as an impurity in the batch raw materials for the melting. The latter colors ionically as $Fe^{3+}$ as well as via Fe/Ti color complexes. Due to the high cost of low-iron raw materials, it is not economical to reduce the $Fe_2O_3$ content to values of 100 ppm and thereunder.

Electronic transitions in color complexes, which absorb in the short-wave region of visible light and in which participates the $TiO_2$ component that is effective for the nucleation, make up the most intense absorption mechanism of transparent glass ceramics. A color complex arises due to the formation of adjacent Fe and Ti ions, between which occur electronic charge-transfer transitions.

The Fe/Ti color complexes lead to a red-brown coloring; the Sn/Ti color complexes lead to a yellow-brown coloring. The Sn/Ti color complexes color more intensely and this circumstance has previously made it difficult to substitute the refining agent arsenic oxide by $SnO_2$ in the case of transparent glass ceramics. The formation of the named color complexes occurs significantly during ceramicizing.

The scattering in transparent glass ceramics is largely determined by the crystallite size and the different indices of refraction of the high quartz mixed crystals and the residual glassy phase, and thus also is largely determined by the ceramicizing. For minimizing the light scattering, it is necessary to align the refraction indices in the region of visible light. The crystallite size should be clearly smaller than the wavelength of visible light and the birefringence of the crystals should be small (Sakamoto et al. "Structural relaxation and optical properties in nanocrystalline β-quartz glass-ceramic", Journal of Non-Crystalline Solids 352 (2006) pp. 514-518).

Small crystallite sizes are obtained with a high density of nuclei and a low maximum temperature for the entire ceramicizing, which lead to the circumstance that the size of the growing high quartz mixed crystals lie below the wavelength of visible light. Typically, the average crystallite size of the high quartz mixed crystals lies in the range of 20 to 60 nm. A high nuclei density presupposes a sufficient content of nucleating agents as well as sufficient nucleation times as well as kinetic properties of the initial glass during the ceramicizing.

For the aligning of the refraction indices in the region of visible light, it is necessary to find favorable composition ranges and ceramicizing conditions, since the composition of the high quartz mixed crystals and the residual glassy phase is a consequence of composition as well as ceramicizing conditions. In this case, the surface layers, and not only the intermediate regions between the individual crystallites within the bulk structure, are included in the so-called residual glassy phase. Consequently, the differences in the refractive indices between surface layer and bulk structure are also decisive for scattering in the transparent, low-color glass ceramic.

The effective nucleating agent $TiO_2$ can only be substituted with disadvantages in melting and shaping by the alternative nucleating agents $ZrO_2$ and $SnO_2$. This means that the desired low melting points and short ceramicizing times lead to an intensified coloring based on the color complexes without visually disruptive scattering via the $TiO_2$ contents required therefor.

Numerous developmental attempts have been made for producing environmentally-friendly, transparent glass ceramics without the use of the refining agents, arsenic oxide and antimony oxide. These could not be implemented previously for technical and economic reasons. Transparency, i.e., high light transmittance and slight coloring without visually disruptive scattering, could not be reconciled with favorable manufacturing conditions.

One approach involves compositions without the nucleating agent $TiO_2$, which lead to disadvantages during production.

Thus, WO 2008/065167 A1 describes the production of environmentally-friendly, transparent glass ceramics without disruptive coloring. These glass ceramics avoid the addition of $TiO_2$ as a nucleating agent and are based on a mixed nucleation by $ZrO_2$ and $SnO_2$. The $ZrO_2$ contents necessary for a sufficiently rapid nucleation are 2-5 wt. %, and the necessary $SnO_2$ contents are >0.4-3 wt. %. With these high contents of $ZrO_2$ and $SnO_2$ the melting of the batch is slowed down, the melting and shaping temperatures are increased, and the resistance to devitrification of the glass is adversely affected. During the shaping, which takes place at viscosities of $10^4$ dPas around the processing temperature $V_A$, disruptive crystal phases containing Sn and Zr crystallize out. This leads to the circumstance that the following ceramicizing process can almost no longer be controlled via the temperature control. In addition, such compositions require extraordinarily high ceramicizing temperatures and thus represent an uneconomical method.

Another approach involves transparent glass ceramics without arsenic oxide and antimony oxide as refining agents and with small contents of $TiO_2$, but which also require higher contents of $SnO_2$ and $ZrO_2$ as nucleating agents. In WO 2008/065166 A1, $TiO_2$ is limited to 0.3-<1.6 wt. %. Contents of $SnO_2$ from 0.25-1.2 wt. % and $ZrO_2$ from >2-3.8 wt. % are required. These high contents are accompanied by the described disadvantages in melting and shaping as well a deficient resistance to devitrification.

The documents JP 11-228180 A2 and JP 11-228181 A2 describe environmentally-friendly compositions of transparent glass ceramics. In order to obtain sufficient bubble qualities without using arsenic oxide as a refining agent, the glass ceramic contains a combination of the refining agents $SnO_2$ and Cl of 0.1-2 wt. %. The physical decoloring agent $Nd_2O_3$ is not used, so that the Sn/Ti color complex fully comes into play. In particular, the high $SnO_2$ contents displayed in the embodiment examples are very harmful for the resistance to devitrification. The documents do not provide any hints of how the $SnO_2$ content must be limited so as to assure sufficient resistance to devitrification. In addition, these publications supply no hint of an optimization of the manufacturing properties by the selection of the components CaO and SrO and the adjustment of crystal composition and composition of the residual glassy phase by the ratios of the divalent components MgO, ZnO, as well as CaO, SrO and BaO.

The physical decoloring of transparent glass ceramics by additions of $Nd_2O_3$ and CoO, which absorb in the longer-wave red spectral region is disclosed in EP 1 837 312. The document preferably describes compositions refined with arsenic oxide. In addition to the use of arsenic oxide, the use of 0.1-0.4 wt. % $SnO_2$ in combination with high-temperature refining above 1700° C. is also disclosed as an environmentally-friendly refining agent. This document does not provide any hint as to how the composition must be created in order to obtain particularly favorable manufacturing conditions, i.e., low melting and low shaping temperatures. There is thus a need for decreasing the melting and shaping temperatures without disadvantages for the rate of ceramicizing, since this is of crucial importance for energy efficiency and economical production.

Common to all of these cited documents is that they describe a two-step ceramicizing process.

The ceramicizing programs that are described in EP 1 837 312 and EP 1 837 314 and are characterized by processing times of less than 2 hours, after the necessary heating phases, have ceramicizing steps with holding times, e.g., at 790° C. and 900° C., on the order of magnitude of 5-30 minutes. The known ceramicizing methods essentially involve isothermal ceramicizing methods.

It has been shown that elaborate experiments are required for each glass composition in order to fine-tune the method parameters to one another so that the glass ceramic has the desired properties, in particular with respect to color and scattering. The experiments are time-consuming and costly.

SUMMARY

The object of the invention is to indicate a glass composition for the production of a glass ceramic that has, for predetermined C* and S values, a processing window that is as large as possible for the nucleation process, in particular with respect to residence times in the temperature range relevant for the nucleation.

This object is achieved with a glass that includes the following components (in wt. %):

$Al_2O_3$ 19-23
$Fe_2O_3$ 0.01-0.02
$Li_2O$ 3.2-4.2
$P_2O_5$ 0-<1.6
$SiO_2$ 64-68
$SnO_2$ 0-0.5
$TiO_2$ 1.6-2.5
ZnO 1.0-2.5
$ZrO_2$ 1.2-2.0 wherein a condition B1 applies:

$$20<(Li_2O+Al_2O_3+SiO_2)/(SnO_2+TiO_2+ZrO_2+Fe_2O_3)<25.$$

A preferred range for B1 is 21 to 25, in particular 22 to 25.

The transparency, which is adjusted after the ceramicizing, shall be as high as possible. It is characterized by the analysis of the light transmittance, which is measured in the CIE color system and is typically designated Y (brightness). A transparent glass ceramic is understood to be a glass ceramic with a Y value of >80.

Moreover, in glass ceramics, the value C*(chromaticity, color) from the CIELAB color system with the coordinates L*, a* and b* is used as a measure for coloring.

C* is understood to be a color location in the CIELAB system, which is defined as the radius vector.

$$c_{ab}^* = \sqrt{a^{*2} + b^{*2}}$$

a* indicates the position of the color coordinate on the green/red axis, whereby negative values correspond to green hues and positive values to red hues. b* indicates the position of the color coordinate on the blue/yellow axis, whereby negative values correspond to blue hues and positive values to yellow hues.

The requirements for the scattering of the glass ceramic are taken from ASTM D1003 (CIE Illuminant A; Method: Procedure B, Diffuse Illumination/Unidirectional Viewing). The scattering is also often designated as haze. It shall amount to less than 3% in the representative central region of the respective sample.

Of course, the resolution of the measurement method based on this standard is insufficiently precise for clearly and reproducibly differentiating values below 3% from one another.

Therefore, the scattering for the glass ceramics produced according to the method and described here is visually evaluated with examination along the polished edges of a long glass-ceramic sample.

The following is understood as the visually determinable scatter value S:

The scattering is evaluated visually when examining the polished edges of a 2-cm long and 4-mm thick, polished glass-ceramic sample. For this purpose, the sample is illuminated by means of daylight and placed on a black background so that it can be looked at over the distance of the 2-cm length. The black background serves for the purpose of assuring the comparability of visual impressions.

Ten ceramicized, arsenic-refined glass-ceramic samples of the glass ceramic ROBAX® (trademark of SCHOTT AG), which were ceramicized in a targeted manner so that different scattering was generated in each case, serve as reference limit samples for the visual evaluation of the scattering under examination. The differences in the scattering were adjusted so that this difference is visually distinct to an observer. These reference limit samples are compared with the samples to be evaluated. The reference limit sample whose scattering comes closest to the sample being evaluated is the measure for quantification of the scattering.

The scattering defined by the limit sample extends from a scale of 0 (no scattering), 1 (very slight scattering as in a reference limit sample of the glass ceramic ROBAX® of the firm SCHOTT AG), 2 (slight scattering as in the second limit sample of the glass ceramic ROBAX® of the firm SCHOTT AG), up to 3 (translucent, milky appearance). Values of 3 and higher are viewed as disadvantageous for the requirements of the market, since the scattering can already be visually disruptive under certain lighting conditions.

The values of 3 and higher correspond to a scattering of 3%, which was determined according to the above-described measurement method.

To confirm the result of this preliminary selection, the visual evaluation can be repeated for a more precise differentiation with samples for which the scattering is to be evaluated visually by examining the polished edges of a 7-cm long and 4-mm thick polished glass-ceramic sample. Here also, the scattering is again evaluated on the basis of a scale from 0 to 3.

The processing window of the residence times $t_{KBA}$ in the temperature range relevant for nucleation depends on the selection of the C* and S values and is reduced, the smaller the values involved are predetermined in each case. For C* values in the range of 4 to 5, a processing window, in particular, one that is more than 10 min., preferably more than 20 min, is understood as a large processing window.

For S values in the range of 1 to 2, a processing window, in particular, one that is more than 20 min., preferably more than 30 min, is understood as a large processing window.

A large processing window has the advantage that in conducting the ceramicizing process, in particular the nucleation process, fluctuations in the process, as are typical for rapid, energy-efficient industrial production methods, can be compensated for without this compensation negatively affecting the product properties to be obtained, such as C* and S in this case. Moreover, disruptions in the furnace, such as, e.g. temperature overshoots, which are usually present as a risk for heating phases, are compensated for without significantly influencing C* and S. It has additionally been shown that the use of constant heating rates instead of isothermal regions offers enormous advantages here, in order to also compensate, for example, for different initial states of the glasses to be ceramicized.

The relevant temperature range for the nucleation preferably lies at T1=680° C. to T2=810° C.

It has been found that in the case of the glass composition according to the invention, large processing windows are available for the residence times, which, e.g., amount to more than 200 min. for C*=5 and to more than 200 min. for S=2.

It has been shown that the size of the processing window is essentially determined by the proportions of the crystal-forming agents, such as $Li_2O$, $Al_2O_3$ and $SiO_3$, and the nucleating agents, such as $SnO_2$, $TiO_2$, $ZrO_2$ and $Fe_2O_3$, whereby crystal-forming agents and nucleating agents must fulfill certain conditions (condition B1).

When the named components deviate from the disclosed quantity ranges, clear reductions in the size of the processing window are established.

In the case of going below the lower limit value of 20 and in the case of exceeding the upper limit value of 25, the size of the processing window is reduced.

A minimum content of $Li_2O$ of 3.2 wt. % is advantageous for a high rate of ceramicizing and for lowering the $10^2$ temperature and the processing temperature $V_A$. Contents higher than 4.2 wt. % are economically disadvantageous due to the high cost of Li raw materials. A content of less than 4 wt. % is particularly advantageous.

In order to avoid higher viscosities of the initial glass and the undesired devitrification of mullite during the shaping, the $Al_2O_3$ content is limited to a maximum of 23 wt. %. The minimum content for the formation of sufficient quantities of the high quartz mixed crystal phase is 19 wt. %, preferably 20 wt. %.

The $SiO_2$ content shall amount to a maximum of 68 wt. %, since this component greatly increases the viscosity of the glass and thus $V_A$ and the $10^2$ temperature. For good melting of the glasses and for low melting and shaping temperatures, higher contents of $SiO_2$ are uneconomical.

The content of $SiO_2$ shall amount to at least 64 wt. %, since this is advantageous for the required properties, such as, e.g., chemical stability, rate of ceramicizing, and transparency. The scattering is reduced due to the high $SiO_2$ content, which indicates that the refractive indices of crystal phase and residual glass will be better matched. An $SiO_2$ content from 65 to 68 wt. % is preferred.

Due to the high cost of low-iron batch raw materials, it is uneconomical to adjust the $Fe_2O_3$ content of the glass to values below 0.01 wt. % (100 ppm). Also, since an input of iron occurs during the recycling of shards via the crushing, an $Fe_2O_3$ content of greater than 0.01 wt. %, in particular of greater than 0.013 wt. % is economically particularly advantageous.

On the other hand, the concentration of Fe/Ti color complexes also increases with the $Fe_2O_3$ content of the glass ceramic. The coloring (chromaticity C*) is enhanced and the light transmittance Y (brightness) is reduced due to absorption. For this reason, the glass ceramic shall contain at most 0.02 wt. %.

Contained as refining agent is 0 to 0.5 wt. % $SnO_2$, preferably 0.05 to 0.5 wt. % $SnO_2$.

Since $SnO_2$ also acts as nucleating agent, it enlarges the processing window in the temperature range and shortens the required ceramicizing times. The component $SnO_2$ is preferably limited to values of 0.5 wt. % at most due to its resistance to devitrification. Higher contents lead to the crystallization of Sn-containing crystal phases on contact materials (e.g., Pt/Rh) during shaping and are to be avoided. Due to the formation of Sn/Ti color complexes, the content of $SnO_2$ is to be selected as small as possible, and the minimum required amount is determined by the requirement for a sufficient refining effect.

A minimum quantity of 0.08 wt. % is appropriate for a sufficient refining effect. The content of $SnO_2$ should be preferably limited to 0.16 wt. % in order to improve the resistance to devitrification and due to the coloring by Sn/Ti color complexes.

This is preferably associated with a coloring C* of less than 5 in the glass ceramic. Preferably, values of less than 4.5 and further, less than 4, are obtained. A high-temperature refining of at least 1800° C. permits higher tank throughputs, since the release of the refining oxygen is accelerated. Of course, higher refining temperatures can increase the formation of $Sn^{2+}$ as well as $Fe^{2+}$ and thus the concentration of the color complexes, so that here, another optimization is necessary.

The $Li_2O$—$Al_2O_3$—$SiO_2$ and also the $Li_2O$—$Al_2O_3$—$SiO_2$—$ZnO$—$P_2O_5$ contents determine both the structure and the composition of the residual glassy phase as well as the crystals (high quartz mixed crystals) that are produced via the ceramicizing in a glass ceramic. A prerequisite for a controlled crystallization/ceramicizing are so-called nucleating-agent oxides, namely $SnO_2$—$TiO_2$—$ZrO_2$—$Fe_2O_3$, which are produced as nanocrystals via the nucleation process or nucleating-agent deposition process and which serve as crystallization centers for the crystals (high quartz mixed crystals). The scattering in glass ceramics is essentially determined by the structure, i.e., the phase content of crystal and residual glassy phases, as well as by the different refractive indices of the phases present in the structure. Thus, both the contents of nucleating agents and crystal/residual glassy phase formers, as well as the nucleation process have decisive importance in adjusting the scattering. Thus, the latter is controlled both by the composition, especially by the above-named ratios, as well by the nucleation process or nucleating-agent deposition process.

Preferably, a condition B2 applies: $21<(Li_2O+Al_2O_3+SiO_2+ZnO+P_2O_5)/(SnO_2+TiO_2+ZrO_2+Fe_2O_3)<26$.

By maintaining the range of 21 to 26, an enlargement of the processing window has once more been shown for predetermined C* and S values.

In the case of going below the lower limit value of 21 and in the case of exceeding the upper limit value of 26, the size of the processing window is reduced.

A preferred range for B2 is 22 to 26, in particular 23 to 26.

In order to also simultaneously assure a minimum coloring, quantified here via C*, the coloring components of the glass ceramic must be kept to a minimum, both with respect to their content as well as with respect to their interactions leading to coloring. The oxides $SnO_2$—$TiO_2$—$ZrO_2$—$Fe_2O_3$ are known as coloring components. Minimum contents are required, however, in order to assure an efficient nucleation process or nucleating-agent deposition process. The ratios of $SnO_2$—$TiO_2$—$ZrO_2$—$Fe_2O_3$ opposite $Li_2O$—$Al_2O_3$—$SiO_2$ as well as $Li_2O$—$Al_2O_3$—$SiO_2$—$ZnO$—$P_2O_5$ are also relevant in this regard.

A preferred composition of the glass or of the glass ceramic contains the following components (in wt. %):

$Al_2O_3$ 21.0-21.7
$As_2O_3$<0.05
BaO 0.2-0.8
CaO 0.1-0.4
$Fe_2O_3$ 0.01-0.016
$K_2O$ 0.05-0.2
$Li_2O$ 3.6-3.9
MgO 0.5-0.8
$Na_2O$ 0.3-0.7
$Nd_2O_3$ 0.02-0.07
$P_2O_5$ 0.01-0.1
$Sb_2O_3$<0.05
$SiO_2$ 65.5-67.5
$SnO_2$ 0.08-0.16
$TiO_2$ 2.0-2.4
ZnO 1.6-1.9
$ZrO_2$ 1.6-1.9
SrO 0.3-0.7.

The glass or the glass ceramic may also contain the following impurities with proportions of up to a maximum of 0.005 wt. %: CoO, $Cr_2O_3$, $Cs_2O_3$, CuO, $MoO_3$, NiO, PbO, $Rb_2O_3$, $V_2O_5$.

The large processing window for ceramicizing should be obtained with commercial batch raw materials. These raw materials have a certain level of impurities. The proportions of impurities shall not exceed 0.005 wt. %, however, since they can negatively influence the chromaticity and the scattering.

This object is also achieved with an LAS glass that is characterized in that it contains the following components (in wt. %):

$Al_2O_3$ 19-23
$Fe_2O_3$ 0.01-0.02
$Li_2O$ 3.2-4.2
$P_2O_5$ 0-<1.6
$SiO_2$ 64-68
$SnO_2$ 0-0.5
$TiO_2$ 1.5-3.0
ZnO 1.0-2.5
$ZrO_2$ 1.2-2.0
MgO 0.5-0.8 wherein a condition B3 applies:

$$21<(Li_2O+Al_2O_3+SiO_2+ZnO+P_2O_5+MgO)/(SnO_2+TiO_2+ZrO_2+Fe_2O_3)<26.$$

By maintaining the range of 21 to 26 for B3, an enlargement of the processing window has once more been shown for predetermined C* and S values.

In the case of going below the lower limit value of 21 and in the case of exceeding the upper limit value of 26, the size of the processing window is reduced.

A preferred range for B3 is 22 to 26, in particular 23 to 26.

It has been found that with this glass composition according to the invention, large processing windows are also provided relative to residence times, which, e.g., amount to more than 200 min. for C*=5 and more than 200 min. for S=2.

The component MgO is incorporated in the high quartz mixed crystals. A minimum content of 0.5 wt. % for MgO is advantageous, since this component reduces the viscosity of the glass melt at high temperatures, i.e., at the melting point. This property is important for economical production.

The MgO content is limited to a maximum of 0.8 wt. %. Higher MgO contents are a disadvantage, since they inadmissibly increase the thermal expansion coefficient of the glass ceramic. Higher contents in the case of the aimed-at short ceramicizing times also lead to an enhanced coloring C*.

Preferably, the glass or the glass ceramic contains 0.01 to 1.6 wt. % $P_2O_5$, preferably 0.02 to 1.6 wt. % $P_2O_5$, in particular 0.03 to 1.6 wt. % $P_2O_5$.

Preferably, a value of <1.6 wt. % applies for the upper limit of the $P_2O_5$ content.

$P_2O_5$ is incorporated in the crystallites and influences the refractive index and thus the scattering. Defined contents preferably between 0.03 and 1.6 wt. % can match the refractive index of the crystals more closely to that of the residual glass and thus reduce the scattering. Therefore, the predetermined scatter value S can be realized in a larger processing window.

Preferably, the glass or the glass ceramic contains 0.05 to 0.5 wt. % $SnO_2$.

Preferably, the glass or the glass ceramic contains 0.01 to 0.1 wt. % $Nd_2O_3$.

The addition of $Nd_2O_3$ leads to a decoloring and reduces the chromaticity C*. Therefore, a predetermined chromaticity C* can be obtained in a larger processing window.

The addition of 0.05 to 0.7 wt. %, preferably 0.3 to 0.7 wt. % of SrO improves the melting capacity and the resistance to devitrification in the shaping of the glass. The content must be limited, however, to 0.7 wt. %, since this component is not incorporated in the crystal phase, but remains in the residual glassy phase of the glass ceramic. Contents that are too high adversely affect the crystallization behavior during the conversion of the crystallizable initial glass into the glass ceramic. In addition, higher contents act unfavorably on the color of the glass ceramic.

A method for determining the processing window of a glass for the production of a glass ceramic provides that in the first temperature process, glass samples are subjected to different residence times $t_{KBA}$ in the temperature range between T1 and T2, that after the ceramicizing process has terminated, the C* values and the S values of the glass samples are determined and are assigned to the residence times for the plotting of measurement curves, and that the regions of the residence times $B_{C*}$ and $B_S$, in which the C* and the S values are selected equal to the predetermined C* and S values or lie below the predetermined C* and S values, and a region of intersection $B_U$ of the $B_{C*}$ and $B_S$ regions is determined in which both the predetermined C* value as well as the predetermined S value maximally lie, wherein $B_U$ forms the processing window for the production of the glass ceramics.

$B_{C*}$ and $B_S$ are the processing windows relative to the predetermined C* and S values.

Ceramicizings with different constant heating rates in the nucleation region are used in order to produce defined different residence times $t_{KBA}$. This has the advantage that, independently of the optimal nucleation temperature range, the residence times $t_{KBA}$ are scaled corresponding to the heating rate. Thus, for example, when the heating rate is cut in half, the residence time in the nucleation phase is prolonged by a factor of 2.

The method has the advantage that the processing window can be determined in a simple way for predetermined C* and S values for a predetermined glass composition. With the method, one can also recognize whether a processing window is provided in general for a desired C* or S value or whether the processing window is sufficiently large in order to be able to maintain the desired C* and S values with a certain level of reliability for a large-scale industrial production.

The method for producing a glass ceramic by utilizing the method for determining the processing window provides that glass samples are subjected in the first temperature process to different residence times $t_{KBA}$ in the temperature range between T1 and T2, that after the ceramicizing process has terminated, the C* values and the S values of the glass samples are determined and are assigned to the residence times $t_{KBA}$ for the plotting of measurement curves, and that the regions of the residence times $B_{C*}$ and $B_S$, in which the C* and the S values are selected equal to the predetermined C* and S values or lie below the predetermined C* and S values, and a region of intersection $B_U$ of the $B_{C*}$ and $B_S$ regions is determined in which both the predetermined C* value as well as the predetermined S value maximally lie, and that the production of the glass ceramics is conducted with a residence time $t_{KBA}$ from the selected region of intersection $B_U$.

It has been found that the measurement curves plotted within the framework of the determination method can be described by the following functions:

$$C^*(t_{KBA}) = \frac{a}{\sqrt{t_{KBA}}} + b \cdot (1 - e^{-ct_{KBA}}) + d$$

$$S(t_{KBA}) = \frac{a}{\sqrt{t_{KBA}}} + b \cdot t_{KBA} + c$$

The parameters a, b, c and d are determined from the measurement curves by suitable fitting methods.

It has been shown here that, in particular, the C* measurement curve and thus also the function $C^*(t_{KBA})$ belonging thereto pass through a clear minimum.

In the case of the S measurement curve and the function $S(t_{KBA})$ belonging thereto, the minimum is less strongly pronounced.

The regions $B_{C*}$ and $B_S$ can be determined by means of the functions $C^*(t_{KBA})$ and $S(t_{KBA})$.

After determining the functions, the processing windows $B_{C*}$, $B_S$ and $B_U$ can be calculated in a simple way for different C* and S values, without needing to carry out additional experiments.

An Example and a Comparative Example will be explained below on the basis of the diagrams of FIGS. 1 to 9.

DETAILED DESCRIPTION

A glass according to the invention (Example) and a comparative glass (Comparative Example) were investigated relative to their processing window.

The compositions of the two glasses are listed in the following Table 1.

TABLE 1

(data in wt. %)

| | Example | Comparative Example |
|---|---|---|
| $Al_2O_3$ | 21.3 | 22 |
| $As_2O_3$ | <0.005 | <0.005 |
| BaO | 0.52 | 1.19 |
| CaO | 0.24 | 0.035 |
| $Fe_2O_3$ | 0.013 | 0.013 |
| F | <0.05 | <0.05 |
| $K_2O$ | 0.11 | 0.29 |
| $Li_2O$ | 3.74 | 3.71 |
| MgO | 0.63 | 0.72 |
| $MnO_2$ | <0.005 | 0.001 |
| $Na_2O$ | 0.52 | 0.38 |
| $Nd_2O_3$ | 0.056 | <0.01 |
| $P_2O_5$ | 0.027 | 1.51 |
| $Sb_2O_3$ | <0.010 | <0.010 |
| $SiO_2$ | 66.48 | 65.5 |
| $SnO_2$ | 0.11 | 0.31 |
| $TiO_2$ | 2.2 | 2.08 |
| ZnO | 1.79 | <0.02 |
| $ZrO_2$ | 1.72 | 2.22 |
| SrO | 0.53 | <0.002 |
| Cl | Not measured | <0.02 |
| $HfO_2$ | 0.04 | 0.04 |

The fluorine concentration was determined by flame spectroscopy, $Li_2O$ was determined wet chemically, and the other elements were determined with x-ray fluorescence spectroscopy.

The impurities CoO, $Cr_2O_3$, $Cs_2O_3$, CuO, $MoO_3$, NiO, PbO, $Rb_2O_3$, $V_2O_5$ in the glasses lie below the concentration of 0.005 wt. %. The measured $HfO_2$ is entrained as an impurity via the $ZrO_2$ raw material.

The respective ratios for the sums of the components, corresponding to conditions B1 and B2, are listed in Table 2. The glass according to the invention complies with the conditions B1 and B2, whereas the comparative glass lies outside these ranges.

TABLE 2

| | Example | Comparative Example |
|---|---|---|
| $Li_2O + Al_2O_3 + SiO_2$ | 91.55 | 91.21 |
| $SnO_2 + TiO_2 + ZrO_2 + Fe_2O_3$ | 4.043 | 4.623 |
| Ratio B1 | 22.6 | 19.7 |
| $Li_2O + Al_2O_3 + SiO_2 + ZnO + P_2O_5$ | 93.367 | 92.72 |
| $SnO_2 + TiO_2 + ZrO_2 + Fe_2O_3$ | 4.043 | 4.623 |
| Ratio B2 | 23.1 | 20.1 |
| $Li_2O + Al_2O_3 + SiO_2 + P_2O_5 + MgO$ | 94.0 | 93.44 |
| $SnO_2 + TiO_2 + ZrO_2 + Fe_2O_3$ | 4.043 | 4.623 |
| Ratio B3 | 23.25 | 20.21 |

Figure 1:
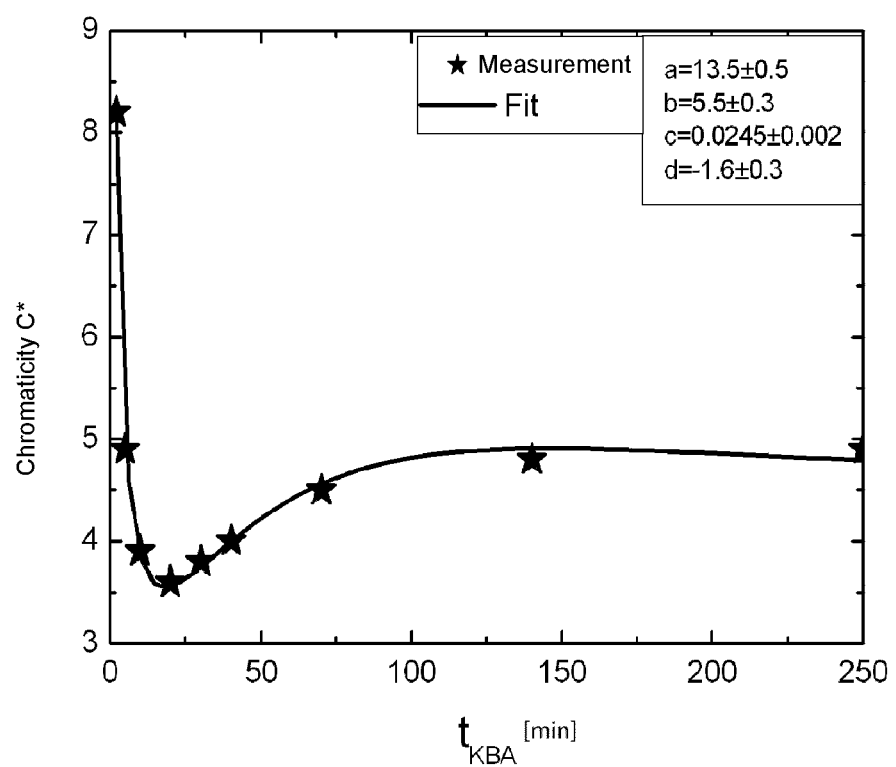
FIG. 1 shows C* as a function of $t_{KBA}$ for a glass according to the invention.

In FIG. 1, C* is presented as a function of $t_{KBA}$ for the Example according to the invention.

The dependence of chromaticity C* on the residence time $t_{KBA}$ can be fitted by the approximation:

$$C^*(t_{KBA}) = \frac{a}{\sqrt{t_{KBA}}} + b \cdot (1 - e^{-c t_{KBA}}) + d$$

The first term characterizes the reduction of the color value C* for short residence times $t_{KBA}$; the second term quantifies the increase in the color value for long residence times $t_{KBA}$.

The parameter a is a measure for the change in color in the case of short residence times $t_{KBA}$; the parameters b and c describe the steepness of the increase in color value for long residence times $t_{KBA}$.

The parameter d is an offset parameter and is decisive in determining the minimum color value that can be obtained.

In order to determine the processing window $B_{C^*}$, e.g., for C*=5, the points of intersection of the constants at C*=5 and the function $C^*(t_{KBA})$ are determined or are calculated from the function $C^*(t_{KBA})$. A value of more than 200 min. results for the processing window $B_{C^*}$ relative to C*=5.

Figure 2:
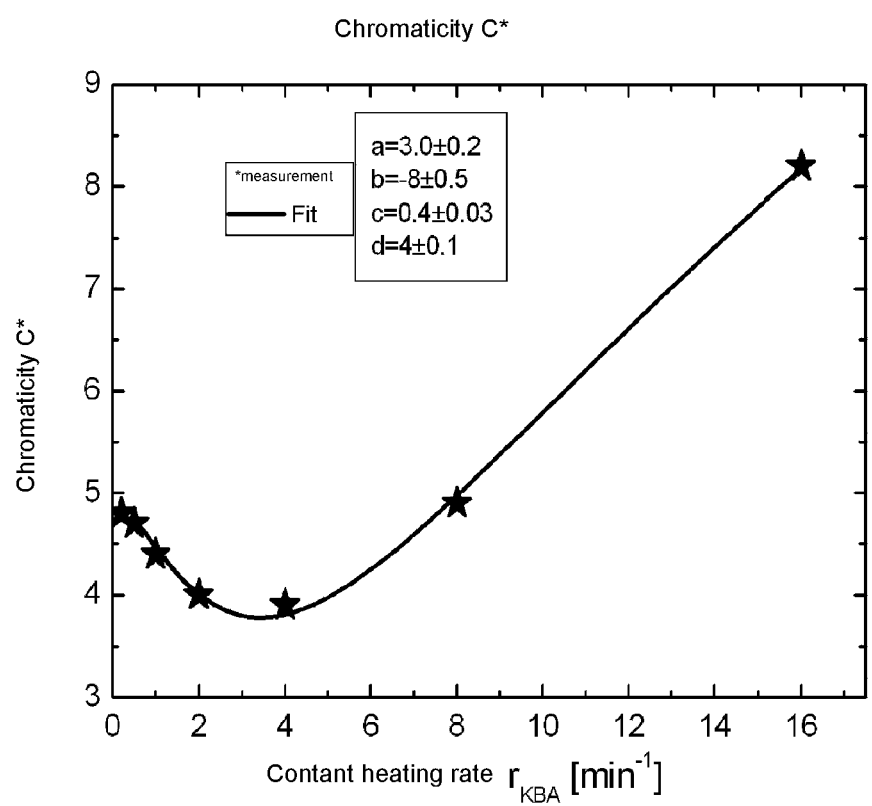
FIG. 2 shows C* as a function of the constant heating rate for a glass according to the invention.

C* as a function of the constant heating rate $r_{KBA}$ belonging thereto is shown in the temperature range T1 to T2 in FIG. 2. In this Example, T1 amounts to 680° C. and T2 amounts to 880° C.

Residence times $t_{KBA}$ can be calculated from the constant heating rates $r_{KBA}$ according to: $t_{KBA}=(T_2-T_1)/r_{KBA}$.

The use of different heating rates leads to the desired different residence times.

The measurement curve of the constant heating rates can also be described by fitting:

$$C^*(r_{KBA}) = a \cdot \sqrt{r_{KBA}} + b \cdot (1 - \exp(-c \cdot r_{KBA})) + d$$

Figure 3:
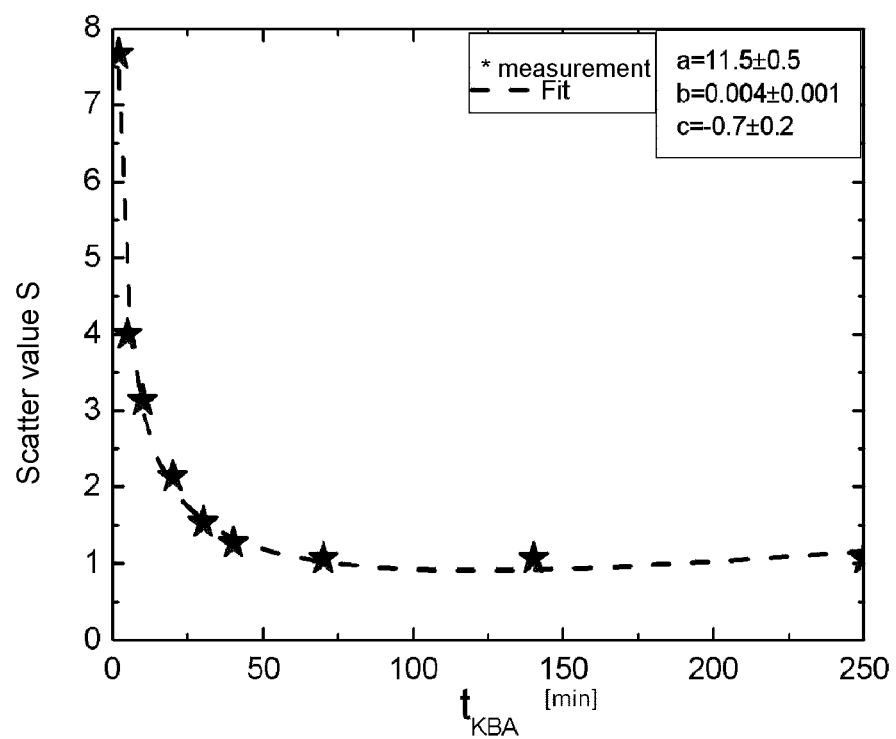
FIG. 3 shows the scatter value S as a function of $t_{KBA}$ for a glass according to the invention.

In FIG. 3, the scatter value S is presented as a function of $t_{KBA}$ for the Example according to the invention.

The dependence of the scatter value S on the residence time $t_{KBA}$ can be fitted by the approximation:

$$S(t_{KBA}) = \frac{a}{\sqrt{t_{KBA}}} + b \cdot t_{KBA} + c$$

The first term characterizes the reduction in the scatter value S for short nucleation times; the second term quantifies the increase in the scatter value for long nucleation times. The parameter a is a measure of the change in color for short nucleation times; the parameter b describes the steepness of the increase in color value for long nucleation times.

The parameter c is an offset parameter and is decisive in determining the minimum scatter value that can be obtained.

In order to determine the processing window $B_S$, e.g. for S=1.5, the points of intersection of the constants for S=1.5 are determined with the function $S(t_{KBA})$ or calculated from the function $S(t_{KBA})$. A value of more than 200 min. results for the processing window $B_S$.

Figure 4:
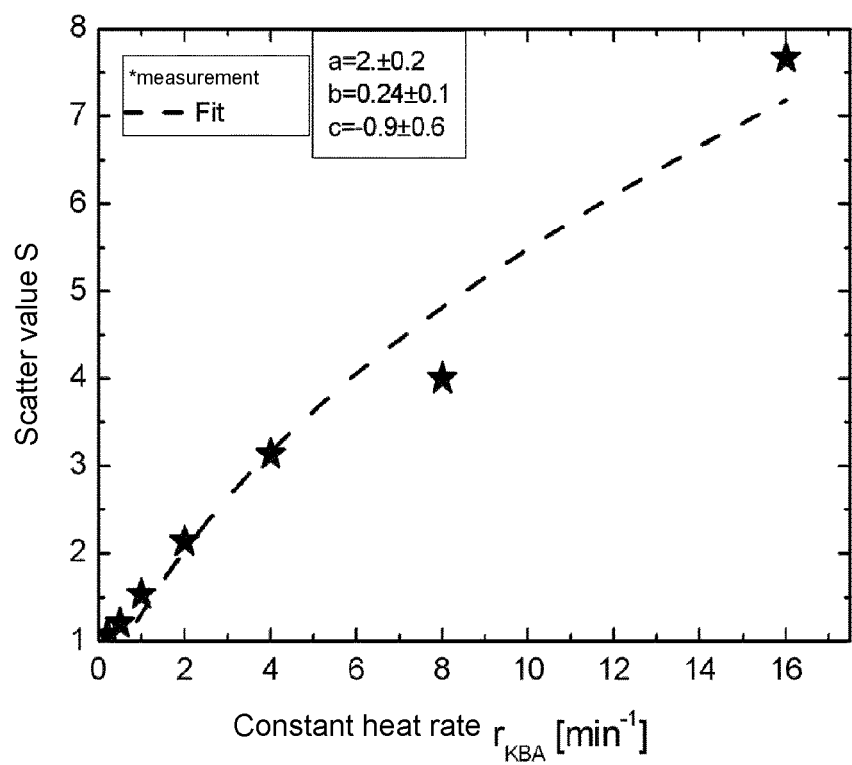
FIG. 4 shows the scatter value S as a function of the constant heating rate for a glass according to the invention.

In FIG. 4, S is presented as a function of the constant heating rate $r_{KBA}$ belonging thereto. This measurement curve can also be described by fitting:

$$S(r_{KBA}) = a \cdot \sqrt{r_{KBA}} + \frac{b}{r_{KBA}} + c$$

Figure 5:
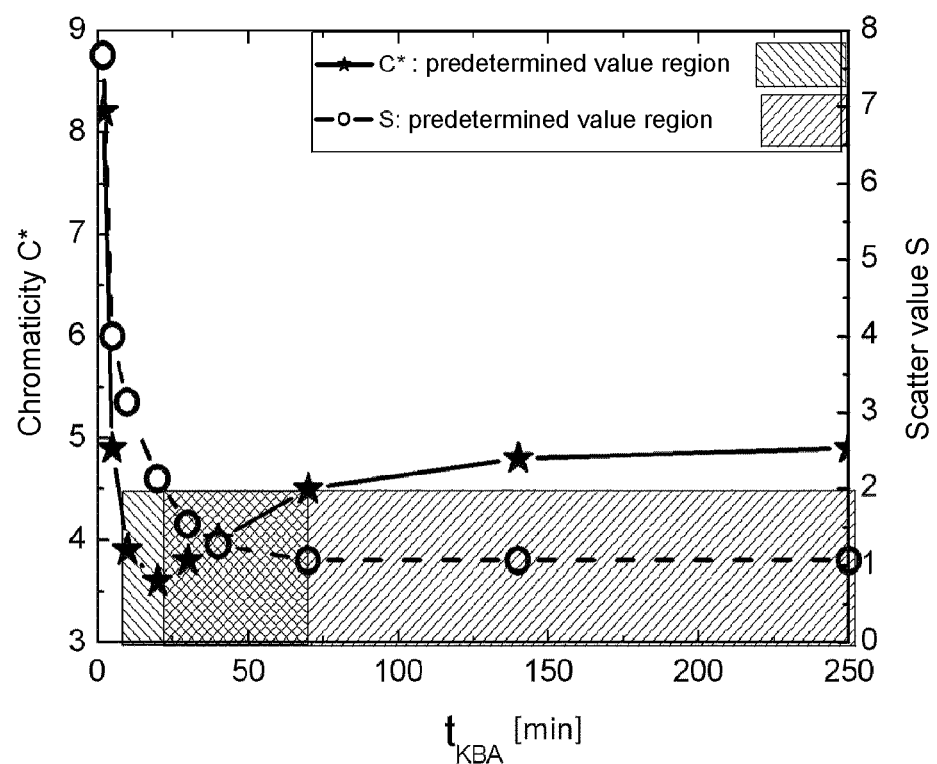
FIG. 5 shows a combined diagram with C* and S as a function of $t_{KBA}$ according to a first embodiment.

In FIG. 5, the diagrams of FIGS. 1 and 3 are combined for the Example C*=4.5 and S=2, in order to determine the region of intersection (processing window $B_U$), which is represented as cross hatching.

Both C*=4.5 as well as S=2 are respected in the window $B_U$. 44 min. results for $B_U$.

Figure 6:
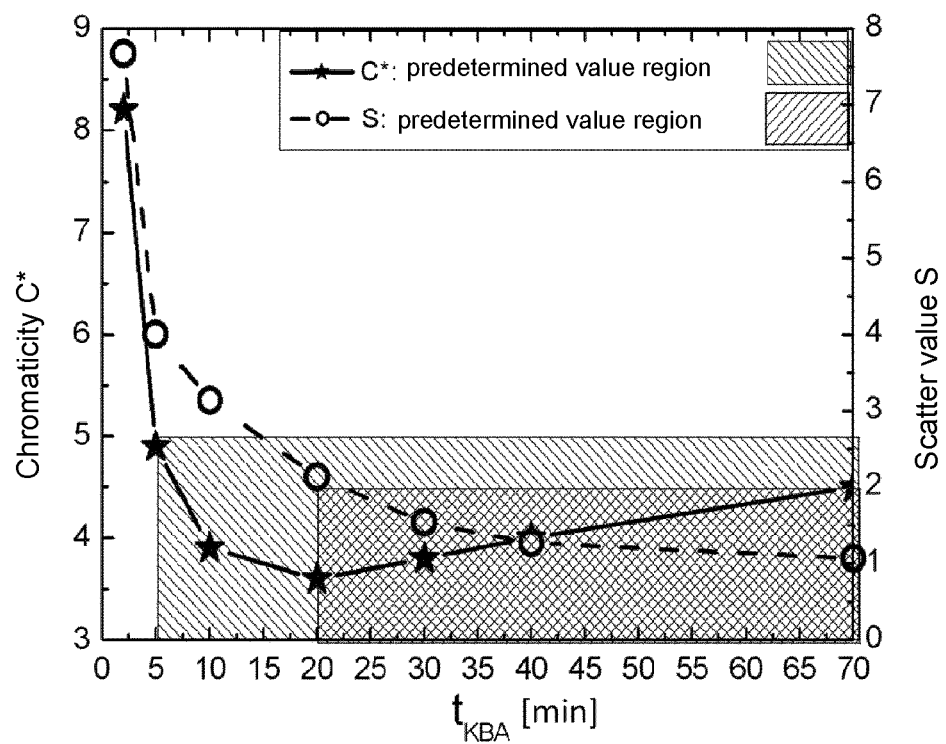
FIG. 6 shows a combined diagram with C* and S as a function of $t_{KBA}$ according to a second embodiment.

The processing windows $B_{C*}$, $B_S$ and $B_U$ are shown for the values C*=5 and S=2 in FIG. 6. 55 min. results for $B_U$.

Figure 7:
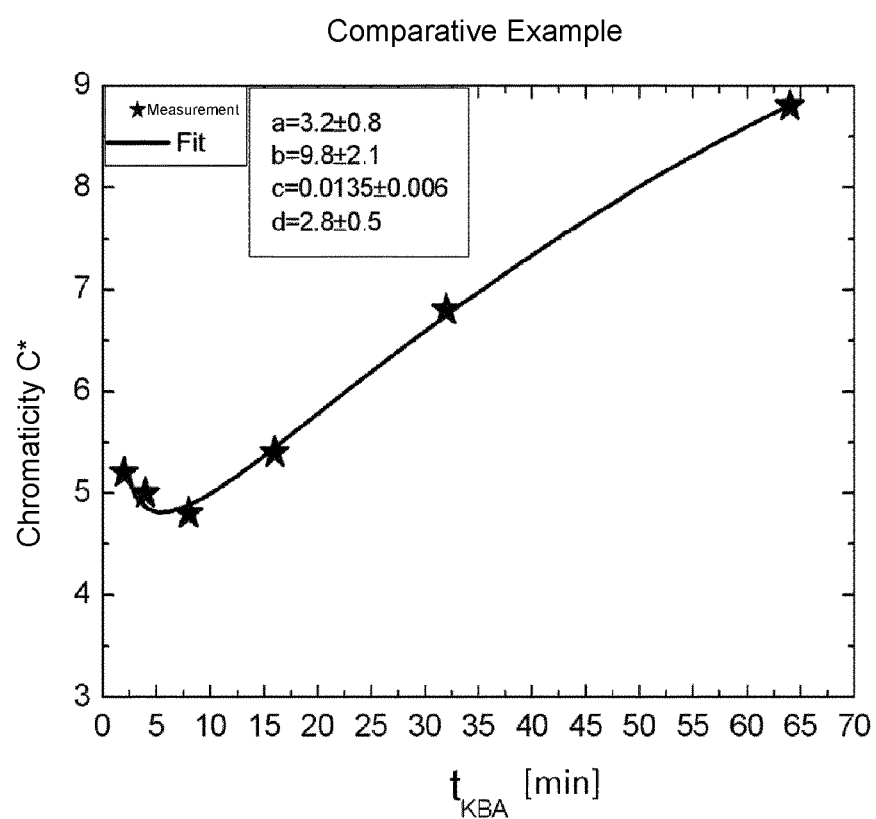
FIG. 7 shows C* as a function of $t_{KBA}$ for a comparative glass.
Figure 8:
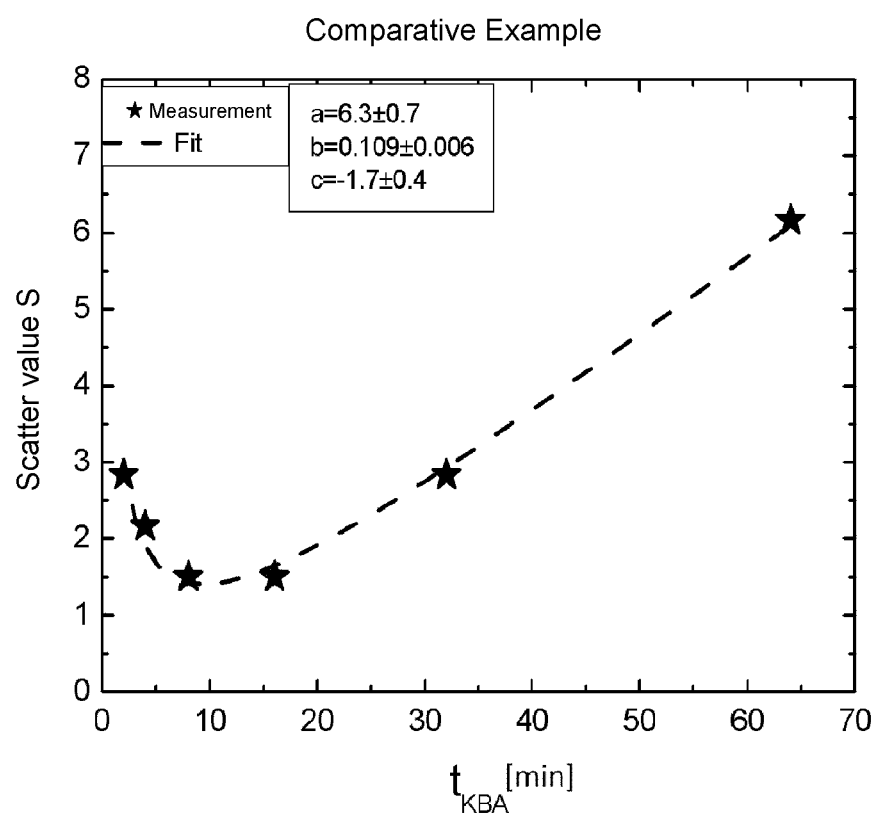
FIG. 8 shows the scatter value S as a function of $t_{KBA}$ for a comparative glass.
Figure 9:
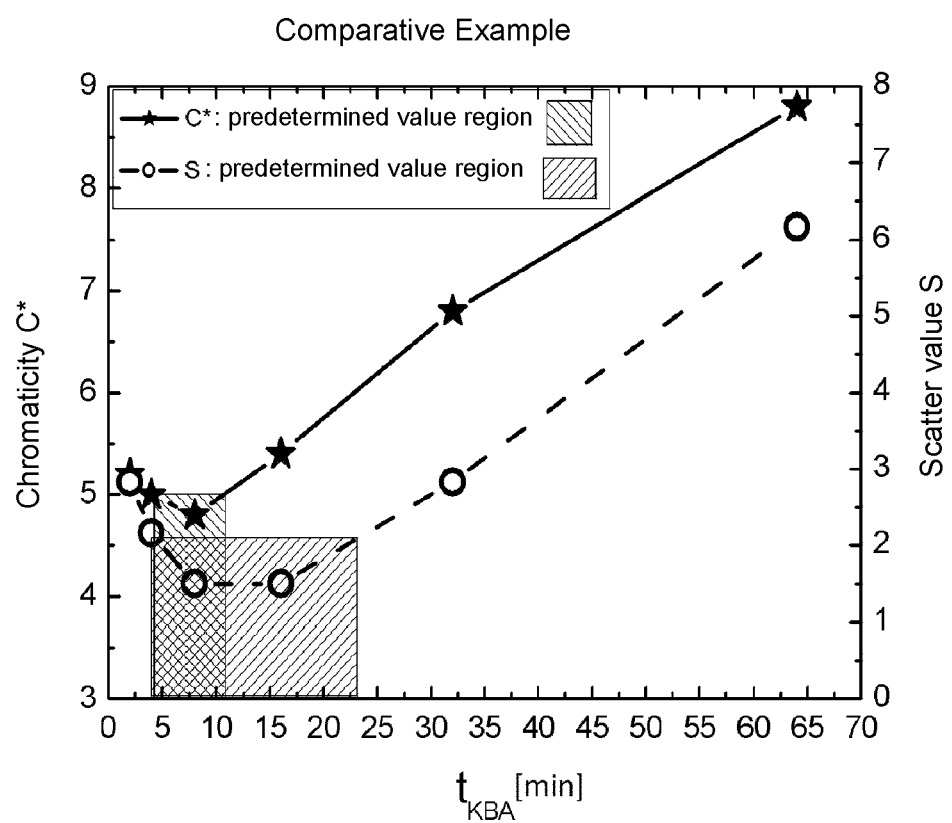
FIG. 9 shows a combined diagram with C* and S as a function of $t_{KBA}$ for a comparative glass.

The corresponding diagrams for the comparative glass are shown in FIGS. 7 to 9.

Evaluation of the processing window $B_{C*}$.

For the Comparative Example. small values result for a, and large values result for parameter b. The parameter c, which is a decisive factor via the decay behavior of the second term, is smaller for the Comparative Example. i.e., the second term has an effect for long $t_{KBA}$ times.

The comparison of the curves/fits shows that clearly larger processing windows $B_{C*}$ with respect to the residence times $t_{KBA}$ are present for the glass according to the invention.

For the glass according to the invention, for example, $B_{C*} = \Delta t_{KBAC*=5} = 200$ min. results. For the Comparative Example, $B_{C*} = \Delta t_{KBAC*=5} = 7$ min.

For the glass according to the invention, for example, $B_{C*} = \Delta t_{KBAC*=4.8} = 100$ min. results. For the Comparative Example, $B_{C*} = \Delta t_{KBAC*=4.8} = 1$ min.

Evaluation of the processing window $B_S$:

For the glass according to the invention, relatively large parameters a and very small values for b are characteristic. For the Comparative Example, in contrast, small values result for a, and large values result for parameter b. The parameter c, which is a decisive factor via the decay behavior of the second term, is smaller for the Comparative Example. i.e., the second term has an effect for long $t_{KBA}$ times.

The comparison of the curves/fits shows that clearly larger processing windows $B_S$ with respect to the residence times $t_{KBA}$ are present for the glass according to the invention.

For the glass according to the invention, for example, $B_S = \Delta t_{KBAS=2} > 200$ min. results.

For the Comparative Example, $B_S = \Delta t_{KBAS=2} = 16$ min.

For the glass according to the invention, for example, $B_S = \Delta t_{KBAS=1.5} > 200$ min. results.

For the Comparative Example, $B_S = \Delta t_{KBAS=1.5} = 5$ min.

In FIG. 9 the region of intersection (processing window $B_U$) only amounts to 7 min. for C*=5 and S=2.

What is claimed is:

1. An $Li_2O$—$Al_2O_3$—$SiO_2$ (LAS) glass for the production of a transparent glass ceramic, comprising:
   components, in wt. of:
   $Al_2O_3$ 19-23,
   $Fe_2O_3$ 0.01-0.02,
   $Li_2O$ 3.2-4.2,
   $P_2O_5$ 0.01-<1.6,
   $SiO_2$ 64-68,
   $SnO_2$ 0.05-0.5,
   $TiO_2$ 1.6-2.5,
   ZnO 1.0-2.5, and
   $ZrO_2$ 1.2-2.0; and
   a condition B1, the condition B1 comprising $20<(Li_2O+Al_2O_3+SiO_2)/(SnO_2+TiO_2+ZrO_2+Fe_2O_3)<25$,
   a condition B2, the condition B2 comprising $22<(Li_2O+Al_2O_3+SiO_2+ZnO+P_2O_5)/(SnO_2+TiO_2+ZrO_2+Fe_2O_3)<26$.

2. The glass according to claim 1, wherein the components comprise:
   $Al_2O_3$ 21.0-21.7,
   $As_2O_3$ <0.05,
   BaO 0.2-0.8,
   CaO 0.1-0.4,
   $Fe_2O_3$ 0.01-0.016,
   $K_2O$ 0.05-0.2,
   $Li_2O$ 3.6-3.9,
   MgO 0.5-0.8,
   $Na_2O$ 0.3-0.7,
   $Nd_2O_3$ 0.02-0.07,
   $P_2O_5$ 0.01-0.1,
   $Sb_2O_3$ <0.05,
   $SiO_2$ 65.5-67.5,
   $SnO_2$ 0.08-0.16,
   $TiO_2$ 2.0-2.4,
   ZnO 1.6-1.9,
   $ZrO_2$ 1.6-1.9, and
   SrO 0.3-0.7.

3. The glass according to claim 1, wherein the composition further comprises 0.01 to 0.1 wt. % of $Nd_2O_3$.

4. The glass according to claim 1, wherein the composition further comprises 0.05-0.7 wt. % of SrO.

5. An $Li_2O$—$Al_2O_3$—$SiO_2$ (LAS) glass for the production of a transparent glass ceramic, comprising:
   components, in wt. %, of:
   $Al_2O_3$ 19-23,
   $Fe_2O_3$ 0.01-0.02,
   $Li_2O$ 3.2-4.2,
   $P_2O_5$ 0.01-<1.6,
   $SiO_2$ 64-68,
   $SnO_2$ 0-0.5,
   $TiO_2$ 1.5-3.0,
   ZnO 1.0-2.5,
   $ZrO_2$ 1.2-2.0,
   MgO 0.5-0.8; and
   a condition B3, the condition B3 comprising $21<(Li_2O+Al_2O_3+SiO_2+ZnO+P_2O_5+MgO)/(SnO_2+TiO_2+ZrO_2+Fe_2O_3)<26$.

* * * * *